J. SHAW.
AUTOMOBILE TIRE.
APPLICATION FILED AUG. 22, 1907.
912,422.
Patented Feb. 16, 1909.
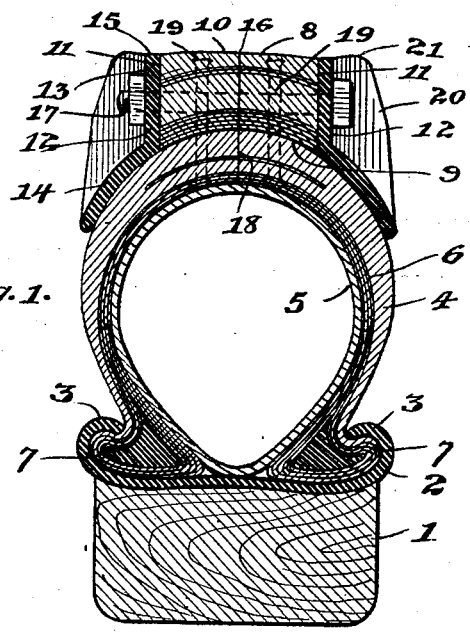
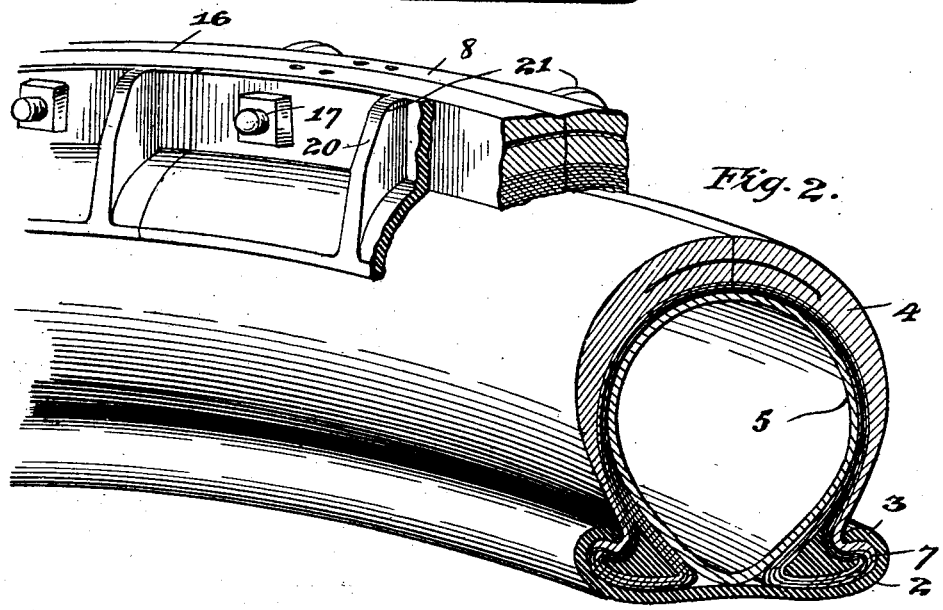
Witnesses,
F. S. Mann,
F. L. Belknap.
Inventor,
Joseph Shaw
Albert N. Graves
By Atty's.

UNITED STATES PATENT OFFICE.

JOSEPH SHAW, OF FORT DODGE, IOWA.

AUTOMOBILE-TIRE.

No. 912,422.  Specification of Letters Patent.  Patented Feb. 16, 1909.

Application filed August 22, 1907. Serial No. 389,603.

*To all whom it may concern:*

Be it known that I, JOSEPH SHAW, a citizen of the United States, residing at Fort Dodge, in the county of Webster and State of Iowa, have invented certain new and useful Improvements in Automobile-Tires, of which the following is a specification.

This invention relates to improvements in automobile tires, and it has for its salient objects to provide a construction in which the tread portion of the tire is provided with a shoe or sheath susceptible of being readily removed, puncture proof and capable of being applied to a previously manufactured tire or embodied as a part of the original construction; to provide in such construction means for increasing the traction qualities of the tire and also preventing or minimizing skidding; to provide a construction which may be manufactured at an extremely moderate cost and without the necessity of expensive machinery or plant; to provide a construction useful in combination with either pneumatic or cushion tires; to provide a construction which when used in conjunction with tires of the clencher type does not prevent the removal of the tire or the opening of the latter to obtain access to the inner tube; and in general to provide an improved tire of the character referred to.

The invention consists in the matters hereinafter described, and more particularly pointed out in the appended claims.

The invention will be best understood by reference to the accompanying drawings in conjunction with the description, in which drawing—

Figure 1 is a cross sectional view of a wheel rim and tire embodying the invention; Fig. 2 is a view in perspective showing parts in cross section of the tire.

Referring to the drawings, 1 designates as a whole a wheel-rim, which may be of any suitable construction and which forms no essential part of the invention; the wheel-rim shown herein being of the clencher type, and to that end provided with the usual channel 2 having the inturned edges or locking flanges 3.

4 designates a pneumatic tire seated in the channel 2, and also of a well-known construction in so far as the main body of the tire is concerned. This tire comprises the usual inner pneumatic tube 5 and an outer sheath or tire proper; the latter being separated circumferentially along its inner side and provided with the usual clenchers or enlarged ribs 7 along each edge which interlock with the channel 2.

Upon the tread portion of the tire 4 I mount a cushion shoe, designated as a whole 8; this shoe being formed of rubber and fabric vulcanized together in a usual and well understood manner. The inner side 9 of the shoe 8 conforms to the periphery of that portion of the tire which normally forms the tread, while its outer surface 10 is more nearly flat. The sides 11 of the shoe are so shaped as to form abrupt shoulders which are embraced and clamped between a pair of confining rings 12. In the preferred construction shown the side faces of the cushion part of the shoe are flat and parallel, the embracing portions 13 of the confining rings are made in the form of flanges or webs which are approximately parallel with the plane of the wheel and the confining rings provided with curved protecting extensions or webs 14 which conform to the respective sides of the tire sheath 6 which they overlie and embrace. The outer edges 15 of the confining flanges 13 are preferably slightly below the outer tread surface 10 of the cushion shoe. The cushion shoe is divided circumferentially or made of two parts, as indicated by the separating line 16, and these two parts and the confining rings held clamped together by means of a series of through-bolts 17 extending through both rings and both members of the cushion.

As a further feature of improvement which may or may not be embodied in the construction, I slit the sheath 6 of the tire circumferentially, as indicated at 18, in a line coincident with the line 16 which divides the shoe and then permanently unite the respective halves of the tread shoe to the corresponding portions of the sheath 6 in any suitable manner, as for example by means of a series of through-rivets, indicated in dotted lines at 19. When so constructed the parts of the cushion tread become in effect integral parts of the tire sheath and the whole structure is obviously reliably held closed by means of the confining rings and clamping bolts. On the other hand, when access is to be had to the inner tube 5, this may be effected without detaching the tire from the rim, by simply removing the through-bolts 17 and opening up the outer periphery of the tire.

Another feature of the present invention resides in providing upon the confining rings 12 traction spurs 20; these spurs taking the form of fillet webs or flanges which occupy the outer angles of the confining rings and are suitably spaced apart, as shown clearly in the drawing. The tread surfaces 21 of these spurs desirably project slightly beyond the corresponding edges 15 of the confining rings and they are desirably rounded at the corners, as shown clearly in Fig. 1. These spurs not only perform the usual function of adding to the traction efficiency of the tire and preventing skidding, but they also reinforce and stiffen the confining rings, which may accordingly be made out of much thinner material than would be reliable without these fillets.

As hereinbefore intimated, the cushion shoe may be formed as an integral portion or portions of the tire as originally constructed, or it may be applied to a finished tire such as that shown in the drawing.

The advantages of the construction will be obvious to those skilled in the art and need not be detailed.

It is to be noted that the tire-embracing portions 14 of the confining rings extend radially inwardly far enough to protect the full tread portion of a tire, or that portion which is liable to injury when running over sharp obstacles, and furthermore these edges are carried inwardly far enough to practically obviate any tendency of the sheath to cut and wear by expanding outwardly under heavy load over the edges of the confining rings.

I claim as my invention:

1. In combination with a pneumatic vehicle tire having an inner pneumatic tube and an outer sheath slitted circumferentially through its tread portion, a tread shoe therefor comprising an elastic non-metallic rib-like body arranged to extend circumferentially around the tread side of said sheath and likewise circumferentially divided, said divided parts abutting directly against each other, means securely uniting the respective halves of the rib-like tread portion to the underlying portions of the sheath, confining rings applied to the laterally opposed sides of said rib-like body, and securing bolts detachably inserted through said confining rings and through the interposed tread body.

2. In combination with a pneumatic vehicle tire having an inner pneumatic tube and an outer sheath slitted circumferentially through its tread portion, a tread shoe therefor comprising a non-metallic elastic rib-like body arranged to extend circumferentially around the tread side of said sheath and likewise circumferentially divided, said divided parts abutting directly against each other, means securely uniting the respective faces of the rib-like tread portion to the underlying portions of the sheath, confining rings applied to the lateral outer sides of said rib like body, flange like extensions extending from the inner boundary of the clamping portion of said rings over the underlying vehicle tire and conforming to the curved contour of the latter, and securing bolts detachably inserted through said confining rings and through the interposed rib like tread portion.

3. In combination with a pneumatic vehicle tire, a tread shoe therefor comprising a non-metallic elastic rib like body arranged to extend circumferentially around the tread side of the tire and conforming to the contour of the latter, confining rings applied to the latter outer side of said rib like body, flange like extensions extending from the inner boundary of the clamping portions of said rings over the underlying vehicle tire and conforming to the curved contour of the latter, securing devices extending through the clamping portions of said confining rings, and traction spurs or webs integral with and projecting laterally from the lateral outer faces of said confining rings and having their radial outer edges approximately flush with the tread surfaces of the rib like tread body.

4. The combination with an elastic vehicle tire, a tread shoe therefor comprising an elastic non-metallic rib like body arranged to extend circumferentially around the tread side of said tire, endless confining members united to said tread and provided with flange like extensions conforming to the curved contour of the tire, traction spurs projecting laterally from the outer faces of said confining members, and means uniting said tread shoe to the underlying portions of the tire sheath.

JOSEPH SHAW.

Witnesses:
EMILIE ROSE,
ALBERT H. GRAVES.